Patented Jan. 23, 1951

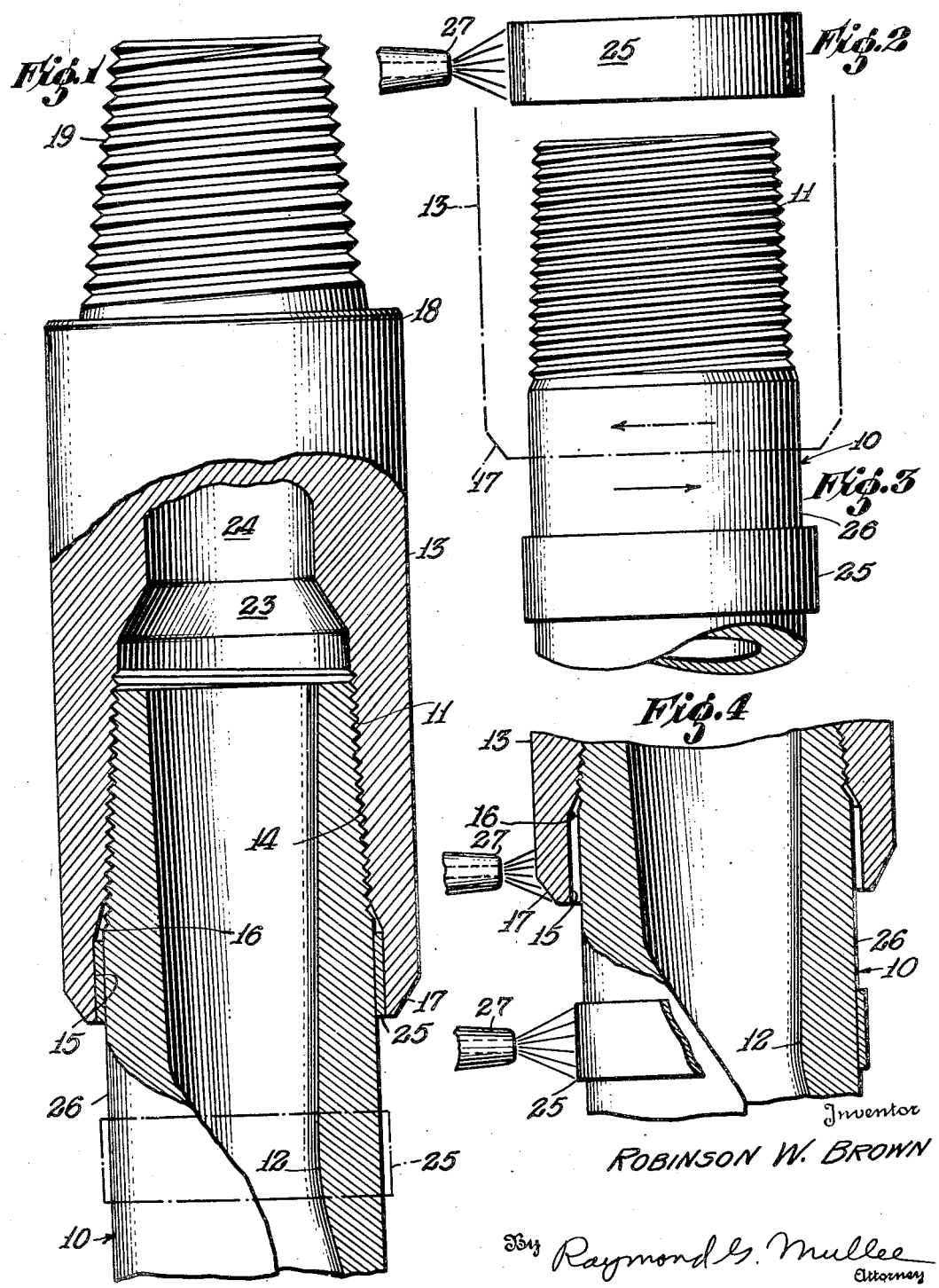

2,539,056

UNITED STATES PATENT OFFICE 2,539,056

METHOD OF ASSEMBLING TOOL JOINTS

Robinson W. Brown, Oklahoma City, Okla., assignor to Chicago Pneumatic Tool Company, New York, N. Y., a corporation of New Jersey Application September 2, 1944, Serial No. 552,478

1 Claim. (Cl. 29—148.2)

The present invention relates to a method of and means for assembling a tool joint with a drill pipe without resorting to welding or use of very high temperatures.

An object of the invention is to assemble a tool joint with a drill pipe in such effective and novel manner as to result in a strong connection free from weak spots or any undue local strains which might cause failure of the pipe during service. This is accomplished in the present invention because the compressive stresses, caused by bucking on of the joints, are carried over the last thread and distributed onto the heavy upset portion of the pipe. Bending stresses at the last engaged thread are also minimized.

A further object is to have a tool joint which is simple and economical to make and to assemble with a drill pipe of standard construction.

Still another object is to prevent further make-up of the threads during service.

According to a feature of this invention, the end of the tool joint is heated to permit the insertion of a ring therein, the ring being adapted upon cooling of the joint to grip the drill pipe in such a manner as to relieve the latter of local stresses which are liable to cause failure of the pipe in service. According to another feature of this invention, the heat is not applied until after the pipe and tool joint have been completely made up or threaded together under controlled torque, thereby obviating difficulties involved in prior methods due to the change in pitch of the threads when heated.

Other objects and features of the invention will be set forth more fully as the specification proceeds, due reference being had to the accompanying drawing in which:

Fig. 1 is an elevation of a tool joint completely assembled with a drill pipe according to the invention, the drill pipe being shown in fragmentary section and a portion of the joint being broken away to disclose details and relations of parts;

Fig. 2 is a side elevation of a sealing and locking ring pertaining to the tool joint, the ring being shown undergoing heating;

Fig. 3 illustrates a step of assembling the tool joint (indicated in broken lines) with the drill pipe, the sealing ring occupying a general initial position; and Fig. 4 shows the tool joint, drill pipe and sealing and locking ring in fragmentary section with the tool joint and ring undergoing heating preliminary to shifting the ring into final locking and sealing position.

When joining drill pipe such as used in drilling oil wells and the like, it has been found by experience that certain weaknesses are apparently inherent in the very structure of conventional tool joints and drill pipes, as the latter frequently tend to fail during service at the last engaged thread on the pipe. In order to remedy this defect and also to insure a fluid tight tool joint, the latter has sometimes been welded with satisfactory results after the parts have first been screwed together cautiously in order to have no more than the proper make-up, but such welding is tedious and costly and necessitates considerable machine work as well as torch work when such welded joints are worn out and require replacement.

In view of these disadvantages and particularly with the foregoing objects in view, the invention is designed to provide a tool joint adapted to be assembled with a drill pipe with the aid of a sealing and locking ring, by bringing the parts together in expeditious and effective manner without resorting to welding or use of very high temperatures.

Hence, referring again to the drawing, the drill pipe 10 has a standard pipe thread 11 on the end thereof and is formed internally with the conventional upset portion 12. The tool joint 13 has a standard internal pipe thread 14 corresponding to the thread 11 on the drill pipe, but between the internal thread 14 and the end of the joint is a relatively long counterbore 15 concentric with the thread, the inner end of the counterbore being relieved by a chamfer or taper 16 merging with the thread 14. At the end the joint optionally terminates in a bevelled shoulder 17 which is useful when raising the drill pipe and joint in a well casing, as the bevel prevents the upper end of the joint from catching upon any obstruction which might interfere with the raising of said drill pipe. Exteriorly along the major portion of the length of the tool joint, the latter has a substantially uniform diameter from bevelled shoulder 17 to the shoulder 18 surmounted by a tapered thread portion 19. The external threads 19 are characteristic of a tool joint pin element and form a quick detachable connection with the internal threads on a tool joint box element, which in turn may be secured to another section of drill pipe in the same manner that pin element 13 is secured to pipe 10.

Within the tool joint, the inner end of internal thread 14 terminates but a short distance from a tapered portion 23 which connects the threaded section with a bore 24 of reduced diameter which continues up through threaded portion 19. To complete the assembly, a relatively thin but wide ring 25 is included, the inside diameter making the ring a close fit on the exterior of pipe 10, while the external diameter is normally several thousandths of an inch greater than the internal diameter of counterbore 15 in the tool joint, which circumstance serves an important purpose set forth hereafter.

In assembling the drill pipe and tool joint, ring 25 is first passed over thread 11 and slipped along pipe 10 to a general initial position on a smooth cylindrical portion 26 of the pipe, and then the tool joint is screwed in upon the latter as indicated by the arrows in Fig. 3, this operation being performed by a bucking-on machine under controlled torque, that is, in such manner as to insure that the tool joint is screwed on the pipe only to a predetermined degree or make-up in order to avoid setting up undesirable strains in either the joint or the pipe which might produce a weak spot ultimately leading to failure of the pipe in service.

Thereafter, the joint and pipe assemblage is removed to a lathe or other machine and rotated about the longitudinal axis of the pipe and one or more heating jets 27 (one shown) directed at shoulder 17 and generally on the end of the tool joint exteriorly of the counterbore 15 in order to expand the latter to a considerable extent. At this juncture, ring 25 is slid along the drill pipe and introduced all the way into the counterbore and the finished assemblage allowed to cool. As the shoulder 17 and the hollow end of the tool joint containing the counterbore contracts, it tightly grips the ring and is fixed thereon in a rigid grip which includes the hold of the ring on the pipe and very largely relieves the threads 11 and 14 of the bending and torsional strains. In the resulting joint rigidity is obtained with the parts held together by a shrink fit which also insures fluid tightness of said joint.

To accommodate the ring 25, the portion 26 of the pipe 10 adjoining the threads 11 should be turned smooth and concentric with the pipe thread. This is the only special feature of construction of the pipe 10 which in all other respects may be a standard A. P. I. internal upset drill pipe. If desired, portion 26 could be upset slightly above the outside diameter of the pipe body. Furthermore, the invention is also applicable to external upset, internal flush, drill pipe.

While ring 25 has been described as capable of being slipped along the drill pipe, the ring in its final state is tightly clamped to the pipe 10 due to the compressive force of the adjacent end of the tool joint 13 upon shrinkage of the latter. According to a modification of this invention, the gripping action of the ring 25 is increased by making the bore of the ring, in its normal condition, slightly less than the outside diameter of pipe 10. In the modified process, the first step is to heat the ring by a group of heating jets 27 (one shown in Fig. 2). The heated ring is then slipped on the pipe to the preliminary or initial general position of Figs. 3 and 4. The remaining steps of the process are the same as those previously described and occur while the ring remains warm and before it has an opportunity to shrink to its normal diameter. Upon final cooling of the parts the ring 25 is under a strain resulting from its own expansion and partial contraction, in addition to the compressive force from the surrounding tool joint.

For the purpose of heating the tool joint and also the ring, gas or oil fed flames or jets 27 have been shown, but in either or both cases, such arrangements are readily replaced by a heating ring, heating by any suitable means such as gas, oil, electricity, etc., and the temperature maintained uniform about the joint or ring as the case may be. The tool joint, drill pipe and ring are preferably made of conventional steel alloy suitable for said parts, and when assembled as described above, need not be welded or assembled with the aid of very high temperatures, but are therefore expeditiously assembled in such manner as to avoid strain on any particular thread of the pipe. When replacing joints, it is necessary only to cut off the old joints with a torch, clean the threads, replace the rings and install new joints.

What is claimed is:

A method of assembling a hollow tool joint having a counterbore in one end and an internal pipe thread within the inner end of said counterbore, with a drill pipe having a substantially uniform external diameter and an external pipe thread on the end thereof, and with a sealing and locking ring, the diameter of the counterbore being uniform and slightly less than the external diameter of the sealing and locking ring and the internal diameter of said ring being uniform and slightly less than said uniform diameter of the drill pipe which method consists in heating the ring to expand it and passing the heated ring in upon the drill pipe to a general initial position within the inner end of the thread on said pipe, screwing the pipe into the tool joint with the external thread of said pipe engaging with the internal thread of said tool joint up to a predetermined degree of torque, heating the counterbored portion of the tool joint in order to expand said counterbored portion, shifting the ring from its initial position into the counterbore, and allowing the assembled tool joint and drill pipe to cool and shrink fit said counterbored portion of the tool joint upon the sealing and locking ring and clamp the latter upon said drill pipe.

ROBINSON W. BROWN.

REFERENCES CITED

The following references are of record in the file of this patent:

UNITED STATES PATENTS

| Number | Name | Date |
|---|---|---|
| 129,691 | Tasker | July 23, 1872 |
| 414,686 | Dinn | Nov. 12, 1889 |
| 1,265,706 | Bardeen | May 7, 1918 |
| 1,332,888 | Corson | May 9, 1920 |
| 1,594,579 | Timbs et al. | Aug. 3, 1926 |
| 2,054,118 | Childs et al. | Sept. 15, 1936 |
| 2,234,957 | Boynton | Mar. 18, 1941 |
| 2,308,066 | Evans | Jan. 12, 1943 |